INVENTORS
DUANE W. HOOLE
GERALD L. KLEIN
TERRY R. VIVIAN
BY Thomas L Peterson
ATTORNEY

United States Patent Office 3,575,834
Patented Apr. 20, 1971

3,575,834
LIQUID JUNCTION STRUCTURE FOR PLASTIC ELECTROCHEMICAL ELECTRODES
Duane W. Hoole, Huntington Beach, Gerald L. Klein, Orange, and Terry R. Vivian, Garden Grove, Calif., assignors to Beckman Instruments, Inc.
Filed Apr. 12, 1968, Ser. No. 720,802
Int. Cl. G01n 27/46
U.S. Cl. 204—195     4 Claims

ABSTRACT OF THE DISCLOSURE

Liquid junction structures for plastic electrochemical electrodes and methods of manufacturing the same are disclosed. One embodiment comprises a tube of plastic having an open end with an ion sensitive structure mounted therein. A small longitudinal channel is formed in the tube which extends from the open end past the membrane to open into the interior of the tube. A bundle of fibers is positioned in the channel covered by a sleeve of injection molded plastic for compacting and restraining the fibers. The embodiment enables a planar sensing surface for a plastic combination electrode. Another embodiment comprises a tube having an extended lip portion surrounding an opening and a shrink tube surrounding the lip portion. A bundle of fibers is positioned in the opening; thereafter the lip portion and the shrink tube are heated to melt and contract the lip portion and the shrink tube respectively about the fibers.

BACKGROUND OF THE INVENTION

Field of the invention

This invention relates generally to liquid junction structures and in particular to liquid junction structures in plastic electrochemical electrodes and to methods of making the same.

Description of the prior art

In electrochemical ion measurements a reference electrode is commonly employed in conjunction with an ion measuring electrode where both electrodes are immersed in a test solution; the potential difference between the two electrodes being a function of the concentration of a specific ion in the solution. It is not uncommon to find a reference electrode and a measuring electrode in a single structure commonly referred to as a combination electrode in which there is a sensing portion and a reference portion.

A reference electrode or reference portion of a combination electrode ordinarily comprises a calomel internal or silver chloride coated silver wire half cell supported within a tube containing a salt solution, the salt solution being known as the reference electrolyte. Electrical contact between the reference electrolyte and the test solution is made by liquid contact via a suitably formed partially plugged opening or passage in the tube, generally referred to as a liquid junction structure. In the past the majority of electrochemical electrodes used glass as a basic structure. Therefore, liquid junctions in the past have been designed specifically for inclusion with a glass electrode. However, because of the many inherent disadvantages of glass, such as fragility and difficulty of sealing glass to non-glass elements, other materials have been developed for use in the basic structure of electrodes.

Plastics are becoming increasingly popular for use as a structural material for electrodes. Because of basic physical and chemical differences between plastic and glass, the liquid junction structures and the methods of making the junction structures for glass electrodes are not completely adaptable to plastic electrodes. For example, a step in making a liquid junction structure in a glass electrode usually comprises the melting of the glass around a plug material located in an opening in the glass. Plastic cannot be used in a similar fashion because it has a tendency to recede from an opening being heated rather than flowing to close the opening. As another example, plastic is hydrophobic, that is, having no affinity for water while glass is hydrophilic, that is, having an affinity for water. Hence a simple pinhole in a glass electrode may work sufficiently well as a liquid junction structure. The same pinhole in a plastic body, however, may not function as a liquid junction because water based electrolytes under some circumstances would not sufficiently overcome their own surface tension to allow adequate flow.

Additionally, with the advent of plastic electrodes structural changes became possible which allowed liquid junction structures to be located in more advantageous positions in the electrode body and at the same time created requirements for new structures to fit such locations. For instance, in a copending application Ser. No. 720,994, filed Apr. 12, 1968, and assigned to the assignee of the present application, there is disclosed a combination electrode comprising a plastic, tubular container having an ion sensitive crystal membrane located at one end of the container so that a flush sensing surface is presented. The liquid junction structure is located at the flush sensing surface to enable measurements in exceedingly small quantities of test solution.

OBJECTS

An object of the present invention is to provide a liquid junction structure for a platsic electrochemical electrode.

Another object of the present invention is to provide a liquid junction structure for a plastic combination electrochemical electrode having a planar sensing surface.

Still another object of the present invention is to provide a liquid junction structure for a plastic electrochemical electrode which is inexpensive, easily manufactured and extremely reliable.

Other objects and many of the attendant advantages of this invention will become more readily apparent to those skilled in the art as the same becomes better understood by reference to the following detailed description of preferred embodiments of the invention when read in connection with the accompanying sheet of drawings.

DESCRIPTION OF THE PREFERRED EMBODIMENTS

Figure 1:
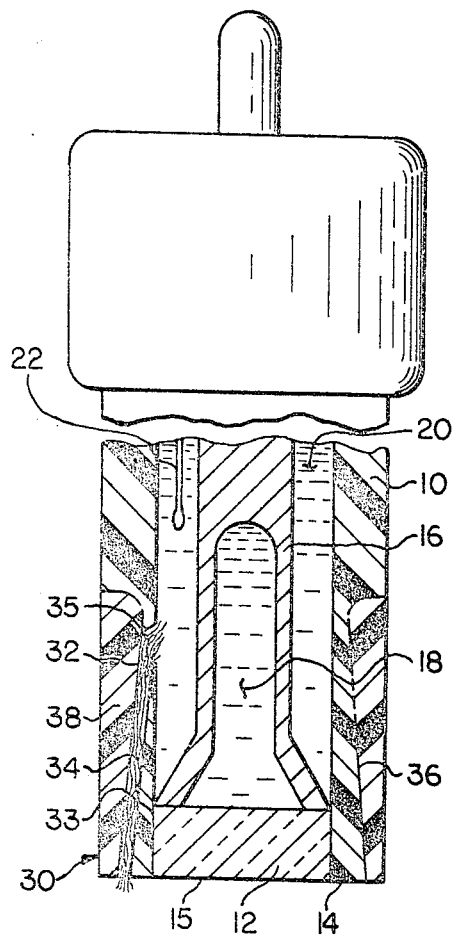
FIG. 1 is a partial sectional view of a plastic electrochemical combination electrode.

Referring now to FIG. 1 there is shown in sectional view a plastic combination electrochemical electrode similar to that disclosed in the above-identified copending application. The combination electrode comprises an injection molded thermoplastic tubular container 10 having an end 14. Mounted in the end 14 is an ion sensitive barrier or membrane 12 having a flat sensing face 15 which is positioned so as to present a planar sensing surface with the end 14 of the container 10. A metal tubular body 16 is coaxially mounted within the container 10. The body is closed at its lower end by the ion sensitive membrane 12 enclosing within the body a sensing electrolyte 18. The body 16, electrolyte 18 and membrane 12 provide an ion measuring electrode for determining the activity of a specific ion in a test solution, the metal body 16 forming the internal half shell of the electrode. The type of ion detected depends upon the membrane material used as is well known to those skilled in the art. An annular enclosure is formed between the tubular container 10 and the tubular body 16 and is adapted to contain a reference electrolyte 20 which is in electrical contact with a reference half cell 22 also located within the annular enclosure. As is well known in the art, the internal half cell and sensing electrolyte of an ion measuring electrode must be electrically isolated from the reference electrode half cell and electrolyte in a combination electrode. As disclosed in the aforementioned application Ser. No. 720,994, this may be accomplished in an assembly as disclosed herein by simply covering the metal tube 16 with an insulating layer (not shown).

Figure 3:
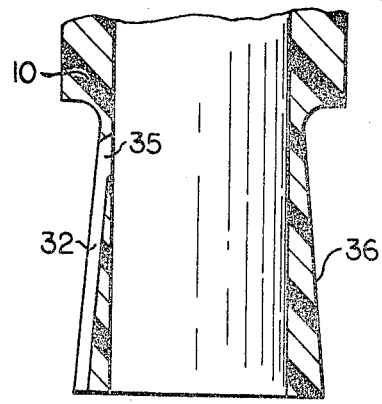
FIG. 3 is a sectional view of a portion of the electrode shown in FIG. 1.

To operate properly the reference half cell 22 must be in stable electrolytic contact with the test solution containing the ions to be detected so as to enable the reference half cell to establish a stable potential. The usual method of communication is by direct contact of the reference electrolyte 20 through a liquid junction structure. The liquid junction of the present invention, generally designated 30, comprises a slightly slanted opening 32 (FIGS. 1 and 3, wherein the size and scale of the liquid junction structure are exaggerated so as to better illustrate the detail involved) such as a channel depressed into the container 10 extending generally longitudinally from the end 14, generally parallel to the lateral surface 33 of the membrane 12, a sufficient distance to bypass the membrane 12 and terminate with an opening 35 into the annular enclosure containing the electrolyte 20. Located within the channel opening 32 is a filament or plurality of filaments 34 which may comprise a single fiber or a bundle of fibers such as asbestos, quartz, linen or other fibrous material. An annular depression 36 extending from the end 14 the same distance as the opening 32 is formed (as best seen in FIG. 3) in the container 10 and is adapted to receive a plastic sleeve 38 which functions to restrain and compact the plurality of filaments 34 as explained in more detail hereinafter.

Figure 2:
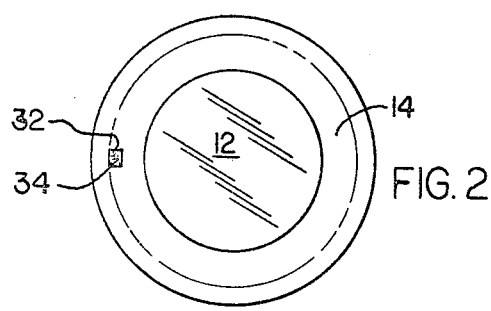
FIG. 2 is a bottom view of the combination electrode of FIG. 1.

A preferred method of manufacturing the liquid junction structure 30 of FIG. 1 comprises injecting a thermoplastic material such as polyethylene, polypropylene, Du Pont "Teflon" or "Kel-F" plastics into a mold to form the tubular container 10 (refer to FIG. 3) with the annular depression 36 in the portion of the container adjacent the end 14 and the opening 32. The plurality of filaments 34 are located generally longitudinally within the opening 32 extending slightly beyond the opening 35 and the end 14. The tubular container 10 is then positioned in another mold to receive an additional injection of thermoplastic material to form the sleeve 38. It has been found that injecting polypropylene or polyethylene at a temperature between 570° F. and 600° F. causes the polypropylene or polyethylene of the tubular container 10, which bounds the annular spacing 36, to liquefy and fuse with the additional thermoplastic material, obliviating a clear demarcation between sleeve 38 and the container 10. Phantom lines are used in FIGS. 1 and 2 to indicate the bounds of the annular depression 36 before the addition of the sleeve 38 and are for the purpose of clarification. Having the sleeve 38 fused with the tubular container 10 eliminates leakage problems of the electrolyte 20 other than that which is controlled through the liquid junction structure. The annular depression 36 is preferably tapered, diverging in the direction of the end 14 (the taper is exaggerated for the sake of clarity), so that in an alternate method of manufacture a sleeve may be injection molded about the tubular container 10 at a lower temperature than that causing the container to liquefy and still produce a sealing fit between the sleeve and the container since the taper will prevent any movement of the sleeve toward the end 14. The provision of a channel opening 32 allows the use of a very fragile fiber (or fibers) such as asbestos since the fiber can be easily and gently laid into position with a minimum of handling.

It is preferabe that the injecting thermoplastic material forming the sleeve 38 be applied directly over the opening 32 which contains the plurality of filaments 34. The perpendicular introduction of the plastic under pressure causes the filaments to compact so as to form the very minute passageways required of a liquid junction structure. By having the ends of the filaments extend slightly beyond the opening 35 and the end 14 the injected plastic will not be able to completely close either of the ends of the channel opening 32.

It is understood that while asbestos fibers are preferred as the plurality of filaments 34, any other material may be used provided that the molding temperatures encountered in the method of manufacture do not have a detrimental effect. Asbestos fibers compact easily allowing minute capillary passages along the fibers so that the electrolyte may pass along the fibers at a very small volumetric flow. By working with thermoplastic material and by using the method of manufacture disclosed, a planar sensing surface may be constructed easily and inexpensively.

Figure 4:
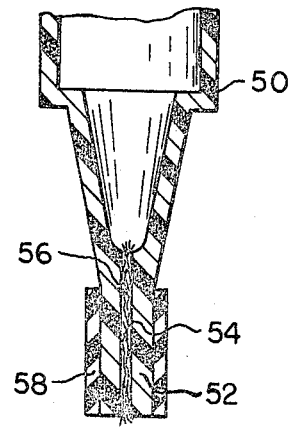
FIG. 4 is a sectional view of a lower portion of a plastic electrochemical reference electrode.

Referring now to FIG. 4 there is shown a preferred embodiment of a reference electrode comprising a plastic tubular container 50 having an extended annular lip portion 52. The tubular container 50 has an opening 54 in the lip portion containing a plurality of filaments 56 longitudinally disposed therein. A plastic sleeve 58 such as a shrink tube is positioned about the annular lip portion 52. A preferred shrink tube is of polyolefin material and may be acquired from Rayclad Tubes Inc. of Menlo Park, Calif.

The method of manufacturing the liquid junction structure embodiment of FIG. 4 comprises the injection molding of the tubular body 50 and lip portion 52 with the opening 54 in the lip portion. Thereafter a plurality of filaments 56, such as a bundle of asbestos fibers, are inserted into the opening 54 and extended slightly beyond the opening 54 at both its ends. The shrink tube 58 is then slipped over the lip portion and heated so as to cause the shrink tube to contract. Since the shrink tube 58 can withstand a greater temperature than the thermoplastic material of the lip portion, the lip portion will melt and under the biasing force of the contracting shrink tube will compact about the plurality of filaments 56. Thus a minute passageway is formed and the filaments are securely restrained.

It will be obvious to those skilled in the art that various modifications may be made or various materials may be used to duplicate the specific embodiments of the invention described. While particular embodiments have been disclosed, it will be understood that the invention is not limited thereto but is defined by the scope of the appended claims.

What is claimed is:

1. A liquid junction structure for a plastic electrochemical electrode comprising:
 a hollow container formed of plastic;
 an annular lip portion extending from one end of said container;
 at least one filament disposed within said lip portion and extending from the interior of said container to the exterior of said lip portion; and
 a plastic shrink tube positioned about the lip portion biasing said lip portion about the filament and restraining said filament therein.

2. An electrochemical electrode of the combination type comprising:
 a hollow container of plastic;
 an ion measuring electrode disposed in said container and being spaced from the wall thereof, said electrode having an ion sensitive barrier, said barrier and said container presenting a planar end surface;
 a reference half cell disposed in the space between said electrode and said plastic container, said reference half cell being adapted to contact a reference electrolyte disposed in said space;

at least one filament in the wall of said plastic container and extending from the inside thereof to said planar surface, said filament providing the sole liquid junction between reference electrolyte in said space and said planar surface adjacent said membrane.

3. In a combination electrode of the type having an ion sensitive membrane supported in a plastic outer housing to form a planar surface, the improvement comprising:

at least one filament firmly retained in said outer housing and extending from the inner surface thereof to the outer surface adjacent to said membrane in said planar surface; and siad filament, except for the ends thereof, being entirely surrounded by an uninterrupted mass of the plastic material of said housing.

4. A liquid junction structure for a plastic electrochemical electrode comprising:

a container of plastic having a passage extending through the wall thereof;

at least one filament firmly retained in said passage, said filament extending from the interior to the exterior of said container; and said filament, except for the ends thereof, being entirely surrounded by an uninterrupted mass of the plastic material of said wall.

References Cited

UNITED STATES PATENTS

| 2,183,531 | 12/1939 | Allison | 204—195 |
| 2,387,727 | 10/1945 | Godshalk | 204—195.1 |
| 3,049,118 | 8/1962 | Arthur et al. | 204—195.1 |
| 3,492,216 | 1/1970 | Riseman et al. | 204—195 |

TA-HSUNG TUNG, Primary Examiner

U.S. Cl. X.R.

204—279; 264—328, 342